(12) United States Patent
Brown et al.

(10) Patent No.: US 9,578,221 B1
(45) Date of Patent: Feb. 21, 2017

(54) CAMERA FIELD OF VIEW VISUALIZER

(71) Applicant: INTERNATIONAL BUSINESS MACHINES CORPORATION, Armonk, NY (US)

(72) Inventors: Michael S. Brown, Wahroonga (AU); James D. Cleaver, Sydney (AU)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/988,026

(22) Filed: Jan. 5, 2016

(51) Int. Cl.
H04N 5/225 (2006.01)
G03B 15/03 (2006.01)

(52) U.S. Cl.
CPC ............ *H04N 5/2256* (2013.01); *G03B 15/03* (2013.01); *G03B 2215/05* (2013.01)

(58) Field of Classification Search
CPC .............................. G03B 15/02–15/07; G03B 2215/00–2215/0596; H04N 5/2256; H04N 5/2354
See application file for complete search history.

(56) References Cited

U.S. PATENT DOCUMENTS

| 2,816,475 | A | * | 12/1957 | Waller et al. | 352/48 |
| 2,920,134 | A | * | 1/1960 | Dresser | H04N 5/222 348/722 |
| 5,059,019 | A | * | 10/1991 | McCullough | 352/131 |
| 5,500,702 | A | * | 3/1996 | Meyers | 396/431 |
| 5,589,905 | A | * | 12/1996 | McIntyre | 396/431 |
| 5,650,817 | A | * | 7/1997 | Jae-chon | 348/240.3 |
| 6,178,297 | B1 | * | 1/2001 | Ting | 396/431 |
| 6,191,818 | B1 | * | 2/2001 | Koizumi | 348/333.01 |
| 6,516,151 | B2 | | 2/2003 | Pilu | |
| 2001/0041073 | A1 | * | 11/2001 | Sorek et al. | 396/431 |

(Continued)

FOREIGN PATENT DOCUMENTS

| EP | 1205790 B1 | 9/2004 |
| WO | WO2008059323 A1 | 5/2008 |

OTHER PUBLICATIONS

Peter Mell et al, The NIST Definition of Cloud Computing, National Institute of Standards and Technology, U.S Department of Commerce, Special Publication 800-145, 2011.

(Continued)

*Primary Examiner* — Dennis Hogue
(74) *Attorney, Agent, or Firm* — Patrick J. Daugherty; Driggs, Hogg, Daugherty & Del Zoppo Co., LPA

(57) ABSTRACT

Camera field of view visualizers differentially illuminate objects visible within and without a camera lens focal area, and also supporting surfaces located outside of but relative to the focal area wherein objects located thereon are visible within the focal area, relative to different supporting surfaces that are also located outside of the focal area but relative to the focal area wherein objects located thereon are not visible within the focal area. At an end of an illumination time period an amount or type of illumination that is visible within image information acquired from objects illuminated thereby within the focal area is reduced or revised for an image data acquisition time period so that it is not visible within image information acquired by an image data receiving means, and image information is captured via the image data receiving means from objects that are located within the focal area.

20 Claims, 4 Drawing Sheets

(56) References Cited

U.S. PATENT DOCUMENTS

| | | |
|---|---|---|
| 2004/0246368 A1* | 12/2004 | Chang et al. ............... 348/373 |
| 2008/0112700 A1* | 5/2008 | Foxenland et al. ........... 396/148 |
| 2008/0122958 A1 | 5/2008 | Huseth et al. |
| 2011/0019073 A1* | 1/2011 | Naimark ..................... 348/370 |
| 2012/0177353 A1 | 7/2012 | Dowell |
| 2013/0021491 A1* | 1/2013 | Lee et al. ................... 348/222.1 |
| 2016/0041451 A1* | 2/2016 | Warrian et al. ........ G03B 13/10 396/373 |

OTHER PUBLICATIONS

Askold V. Strat et al, A Point-and-Shoot Color 3D Camera, Proceedings, Fourth International Conference on Source: IEEE Xplore, http://www.inf.ufrgs.br/~oliveira/pubs_files/StratA_OliveiraM_Point_and_Shoot_3D_Cam_3DIM.pdf, 2003.

* cited by examiner

Illuminating, in a first amount or type of illumination, for an illumination time period, at least one of:
(i) a (first) object that is visible within a focal area of a camera lens, and
(ii) a (first) supporting surface that is located outside of the focal area and relative to the focal area wherein objects located on the first supporting surfaces are visible within the focal area

102

Illuminating, in a second amount or type of illumination that is different from the first amount or type of illumination, for the illumination time period, at least one of: (iii) another (second) object that is outside of the focal area, and (iv) other (second) supporting surface that is located outside of the focal area and relative to the focal area wherein objects located on the other supporting surface are not be visible within the focal area

104

If first amount or type of illumination is visible within image information acquired by image data receiving means from objects illuminated thereby within the focal area, at an end of illumination time period, for image data acquisition time period, reduce or revise first amount or type of illumination to revised amount or type that is not visible within the acquired image information

106

During the acquisition period of time, image data receiving means captures image information from objects that are located within the focal area

108

Additional images(s) required?

110

YES

NO

End

CAMERA FIELD OF VIEW VISUALIZER

BACKGROUND

A camera recording video or still images commonly focuses upon only a portion of a given area of an entire, 360 degree span of visual scene information present in the physical world encompassing the camera. Field of view and "angle of view" (AOV) are terms commonly used to describe an angular extent of a given subset scene of an entirety of a surrounding scene from which image data is captured by a given camera as a function of its lensing system and its image data acquisition system.

Angles of view may vary widely between different cameras due to differences in deployed lens systems and imaging system attributes. For example, arrays of digital sensors are usually smaller than 35 mm film, and this causes a lens to have a narrower angle of view than with 35 mm film, by a constant factor for each sensor. Accordingly, gauging or estimating the angle of view for a given camera is generally impractical without engaging and using a viewfinder of the camera, for example by directly looking into a viewfinder or by viewing streaming data provided by the camera on a video monitor or other graphic display device.

BRIEF SUMMARY

In one aspect of the present invention, a method for a camera field of view visualizer includes illuminating for an illumination time period one (or both) of: (i) (first) objects visible within a focal area of a camera lens and/or (first) supporting surfaces located outside of the focal area but relative to the focal area wherein objects located on the first supporting surface are visible within the focal area, in a first amount or type of illumination; and (ii) different (second) objects located outside of the focal area, and/or different (second) supporting surfaces that are located outside of the focal area and relative to the focal area wherein objects located on the second supporting surface are not visible within the focal area, in a second amount or type of illumination that is different from the first amount or type of illumination. At an end of the illumination time period, in response to a determination that the first amount or type of illumination is visible within image information that is acquired from objects illuminated thereby within the focal area, the first amount or type of illumination is reduced or revised for an image data acquisition time period so that the reduced or revised first amount or type of illumination is not visible within the image information acquired by the image data receiving means. Thus, image information is captured via image data receiving means from objects that are located within the focal area during the acquisition period of time.

In another aspect, a system has a hardware processor in circuit communication with a computer readable memory and a computer-readable storage medium having program instructions stored thereon. The processor executes the program instructions stored on the computer-readable storage medium via the computer readable memory and thereby illuminates for an illumination time period one (or both) of: (i) (first) objects visible within a focal area of a camera lens and/or (first) supporting surfaces located outside of the focal area but relative to the focal area wherein objects located on the first supporting surface are visible within the focal area, in a first amount or type of illumination; and (ii) different (second) objects located outside of the focal area, and/or different (second) supporting surfaces that are located outside of the focal area and relative to the focal area wherein objects located on the second supporting surface are not visible within the focal area, in a second amount or type of illumination that is different from the first amount or type of illumination. At an end of the illumination time period, in response to a determination that the first amount or type of illumination is visible within image information that is acquired from objects illuminated thereby within the focal area, the first amount or type of illumination is reduced or revised for an image data acquisition time period so that the reduced or revised first amount or type of illumination is not visible within the image information acquired by the image data receiving means. Thus, image information is captured via image data receiving means from objects that are located within the focal area during the acquisition period of time.

In another aspect, a computer program product for a camera field of view visualizer has a computer-readable storage medium with computer readable program code embodied therewith. The computer readable hardware medium is not a transitory signal per se. The computer readable program code includes instructions for execution which cause the processor to illuminate for an illumination time period one (or both) of: (i) (first) objects visible within a focal area of a camera lens and/or (first) supporting surfaces located outside of the focal area but relative to the focal area wherein objects located on the first supporting surface are visible within the focal area, in a first amount or type of illumination; and (ii) different (second) objects located outside of the focal area, and/or different (second) supporting surfaces that are located outside of the focal area and relative to the focal area wherein objects located on the second supporting surface are not visible within the focal area, in a second amount or type of illumination that is different from the first amount or type of illumination. At an end of the illumination time period, in response to a determination that the first amount or type of illumination is visible within image information that is acquired from objects illuminated thereby within the focal area, the first amount or type of illumination is reduced or revised for an image data acquisition time period so that the reduced or revised first amount or type of illumination is not visible within the image information acquired by the image data receiving means. Thus, image information is captured via image data receiving means from objects that are located within the focal area during the acquisition period of time.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 2 is a flow chart illustration of a method or process for a camera field of view visualizer according to an embodiment of the present invention.

DETAILED DESCRIPTION

Figure 1:
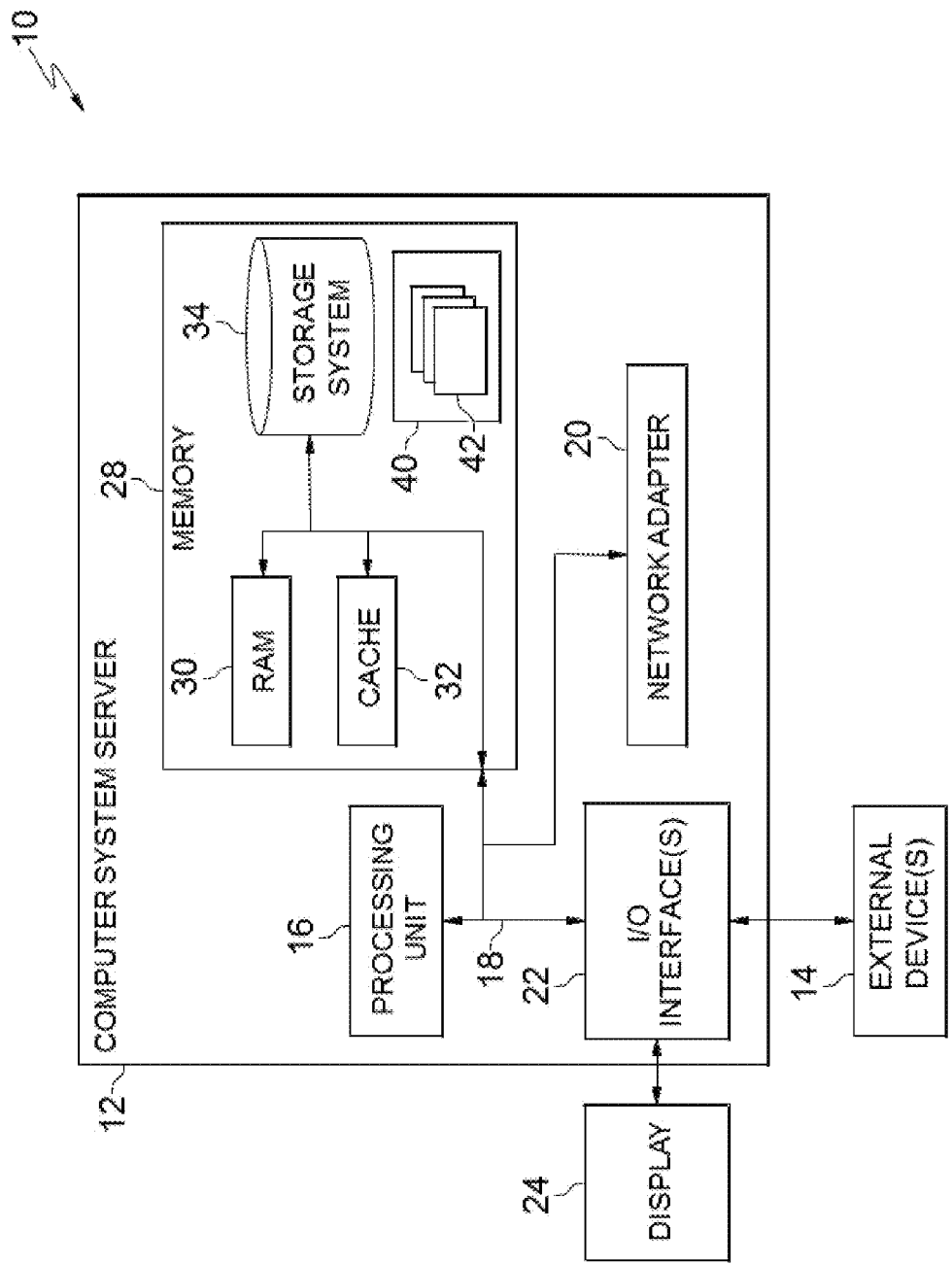
FIG. 1 depicts a computerized aspect according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays(FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic of an example of a programmable device implementation 10 according to an aspect of the present invention. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It may be problematic to give notice to persons as to whether they are within a camera focus focal plane and thereby subjects of image information captured by the camera, or are instead outside the scope of the focal plane and the generated image information. In the prior art persons must either look through a viewfinder, monitor a display screen receiving a camera feed, or be instructed by another person (such as a photographer) who is receiving the viewfinder or display screen information. While this approach is sufficient for the photographer or videographer, it is not a convenient or reliable method for subjects being filmed or photographed, or for third party observers watching the filming or photographing taking place. For example, a pedestrian walking through an area with many tourists taking photos may be unsure if he or she is walking through images acquired by other tourists holding cameras aimed at other tourists present within the scene. This is due in part to any effective visual notice or boundary provided to the pedestrian, as well as to whether the tourists operating the cameras are just setting up a shot (wherein the pedestrian may freely walk through the shot without interfering), or are instead taking a photo (wherein the pedestrian may want to avoid appearing in or otherwise interfering in creation of the desired photo).

At a social event a photographer may be taking photos of attendees, wherein people in the room or area within the scope of focus of the camera may desire to be excluded from the photos due to privacy concerns, or may wish to be included but are unsure if they are in the frame or not. The prior art provides no effective means for such people to determine whether or not they are within the scope of the photographer's lens.

Acquiring visual information for film or video productions that require the coordinated movements and efforts or multiple people in real-time presents additional problems and complexities. A boom operator on a film set may need to get a microphone (mic) as close to the subjects as possible without the equipment appearing in the frame of the shot, but cannot determine whether the mic is close enough and outside the view, or too close and therefore within the view, without consulting viewfinder information that may not be directly available to the boom operator in real-time. A director supervisor filming on site may not be able to see what is in frame without looking through the viewfinder, interfering with real-time direction of movements on the site. Such problems are exacerbated when the camera or subjects are moving during the image information capture, with delays in determining or translating locations via viewfinder mechanisms to present locations of objects, persons and focal planes resulting in mismatches between a desired scene composition of visible objects and the real-time presence, or the absence of objects of interest within the focal plane at any given time. For example, the boom operator may dip the boom mic into the shot, and only realize this when it is seen in a video viewfinder feed, which is too late as the shot has already been ruined by the presence of the mic.

Problems also arise in public safety and security settings. A closed circuit camera must be properly focused or adjusted to ensure that there are no or minimal "blind spots," regions within a physical area to be covered by the closed circuit camera system but wherein visual information is not successfully obtained, and therefore movements and actions of people may not be sufficiently captured by the camera system. Commuters waiting for a train late at night on a station platform may be unaware as to the scope of camera coverage, and thus cannot be sure that they are visible within areas being remotely monitored by security staff. Maintenance crews and commuters generally do not have access to viewfinder feeds from security cameras, and therefore solutions to these problems under the prior art generally necessitate the help of another, perhaps remotely located person to analyze the viewfinder data and communicate with the maintenance crew or commuter.

Aspects of the present invention provide systems and methods for a camera field of view visualizer. For example, FIG. 2 (or "FIG. 2") illustrates a computer implemented method or process of an aspect of the present invention wherein a processor (for example, a central processing unit (CPU)) executes code, such as code installed on a storage device in communication with the processor, and thereby performs the process step elements illustrated in FIG. 2. At 102 the processor drives or causes a light source to illuminate in a first amount or type of illumination, for at least an illumination period of time, at least one of (i) a (first) object that is visible within a focal area of a camera lens; and (ii) a (first) supporting surface that is located outside of the focal area and relative to the focal area wherein objects located on the first supporting surface are (or would be) visible within the focal area.

At 104, the process illuminates for the illumination time period, in a second amount or type of illumination that is different from the first amount or type of illumination, at least one of (iii) another (second) object that is located outside of the focal area, and (iv) another (second) supporting surface that is located outside of the focal area and relative to the focal area wherein objects located on the second supporting surface are not (or would not be) visible within the focal area.

Thus, embodiments of the present invention differentially illuminate objects visible within a focal area of a camera lens, and/or supporting surfaces that are outside of the focal area but wherein objects located thereon (pedestrians, bystanders, people walking around and through a photographic studio, equipment, cases, objects, etc.) would be (are) visible within the focal area of a camera lens, from other objects that are outside of the focal area, and/or other supporting surfaces wherein objects located thereupon will not be visible within the focal area of a camera. Differential illumination at 102 and 104 marks these different classes of objects and surfaces visually and distinctively, thereby visually mapping out and distinguishing the camera focal area objects and impacted supporting surfaces as a subset area within an encompassing larger physical area, one clearly differentiated from other areas that are outside the scope of coverage of photographic or video data information acquired by the camera. In some aspects, the differences in illumination are binary: with respect to each of steps 102 and 104 it will be understood that in different embodiments of the present invention either of the first or second amounts or types of illumination may be a "no illumination" amount or type, wherein the other is an "illumination on" amount or type.

At 106, at the end of the illumination time period, if determined that the first type or amount of illumination is visible within image information acquired by an image data receiving means from objects illuminated and visible within the focal area (for example, as focused upon the image data receiving means by a camera lens), the first type or amount of illumination is reduced or revised for an image data acquisition time period to a reduced or revised illumination amount or type that is not visible within said image information acquired by the image data receiving means. For example, an illuminating light source is turned off, or reduced in intensity, or changed to a different color or wavelength that is not visible within the acquired image data, for the acquisition time period at 106.

During this acquisition time period, at 108 the image data receiving means acquires image information from the objects that are located within the focal area. For example, a camera shutter that is located between the lens and the image data receiving means is opened and reflected light is captured by the lens and focused upon the image data receiving means, resulting in alteration of the chemical structure of a photographic film image data receiving means. Or digital image sensor image data receiving means are selectively controlled via signal to transform the acquired image information into input data.

Embodiments configured for acquiring multiple, independent images or image frame data may repeat the processes at 102-108, for example iteratively, until a desired amount of images or frame data is acquired. Thus, in some embodiments at 110, at the end of the image data acquisition time period, the shutter closes, or the image sensors stop transforming image information into image data, etc., and the process iteratively returns to 102 to acquire additional photos, image frame data, etc., until the image data acquisition or photographic process is terminated at 112 (for example, in response to acquiring a threshold amount of photographic or image frame data, or in response to a signal by an operator to terminate the image data or photo acquisition process, etc.).

Figure 3:
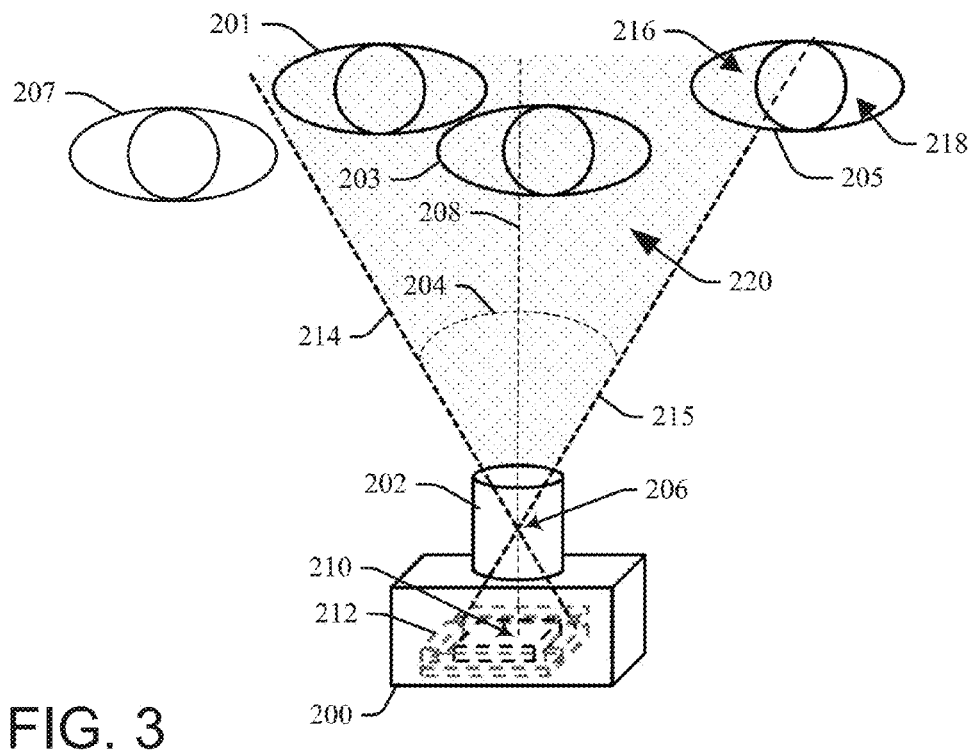
FIG. 3 is a graphic representation of an implementation of one embodiment of the present invention.

A camera recording still images or pluralities of frame images commonly focuses upon only a portion or subset of an entirety of an area of the physical world encompassing the camera that is within an angle of view of its lens system. For example, as illustrated in FIG. 3, a lens 202 of a camera system 200 has an angle of view 204 that defines the scope of coverage that the lens 202 may capture image information from focus upon an image data receiving means 212 (a photographic film, an array of digital image sensors, a single image sensor, laser diodes, charge coupled device (CCD), etc.) of the camera 200. In the present view, the scope of the angle of view 204 is demarcated from other areas by left and right outer boundary lines 214 and 215. As will be appreciated by one skilled in the art, the angle of view 204 is generally defined from an axial line 208 passing through a center point 206 of the camera lens 202 and a center point 210 of the image data receiving means 212. Where the lens 206 has a generally spherical circular structure relative to the axial line 208 the angle of view 204 defines a conical focal area about the axial line 208 projecting outward from the camera, which spreads outward as distance increases from the camera 200, and which may be effectively altered into square, rectangular, ovoid or other shape for image data acquisition by the image data receiving means 212. (It will be appreciated by one skilled in the art that the lens 202 and angles of view 204 may have a variety of different shapes and geometries, and embodiments of the present invention are not limited to practicing within the specific geometries of the examples described herein.)

Accordingly, in the present example, image information with respect to two persons (or other light-reflecting objects) 201 and 203 that are located in front of the camera 200 and entirely within the angle of view 204 is acquired by the lens 202 and focused on the image data receiving means 212. However, only image information for that portion 216 of another person (object) 205 that is located within the angle of view 204 (to the left of the right boundary line 215) is acquired by the lens 202 and focused on the image data receiving means 212. A remainder portion 218 of the third person 205 that is outside of the angle of view 204 (to the right of the right boundary line 215), and another, fourth person/object 207, are omitted from the acquired image information.

Absent timely acquiring and interpreting image information from the camera 200, and timely conveying necessary instructions to the persons 205 and 207 to relocate to other positions wherein they are entirely within the angle of view 204, the image information focused on the image data receiving means 212 will exclude part of person 205 and all of person 207. In the prior art, the times required to perform each of these steps may exceed the time available for acquiring a desired image, and the opportunity may be lost.

In contrast, some embodiments of the present invention project light outward from the camera 200 within and coextensive with the angle of view 204 (at step 102 of FIG. 2), thereby illuminating any objects and surfaces within (those that are located between the left and right outer boundary lines 214 and 215, and within any upper or lower boundaries of the focal area, omitted in this view) with visible light that is perceived by the human eye (via reflection). Thus, as shown by differential dotted shading in the view of the focal area region 220 of FIG. 3 that is defined between the left and right outer boundary lines 214 and 215, the persons 201 and 203 and the left portion 216 of person 205 are illuminated, while the remainder right portion 218 of person 205 and the other person 207 are not. This illumination is visible to each of the persons 201, 203, 205 and 207 and therefore quickly and immediately conveys to each whether or not they are within the view angle of the camera, and they can use this information to quickly adjust their positioning as desired in real-time, to move into or out of the view of the camera as needed until they are illuminated or not illuminated to an extent that correlates with their intended presence within the captured image, without the necessity of using viewfinder or video feed information from the camera itself, as required under the prior art.

Figure 4:
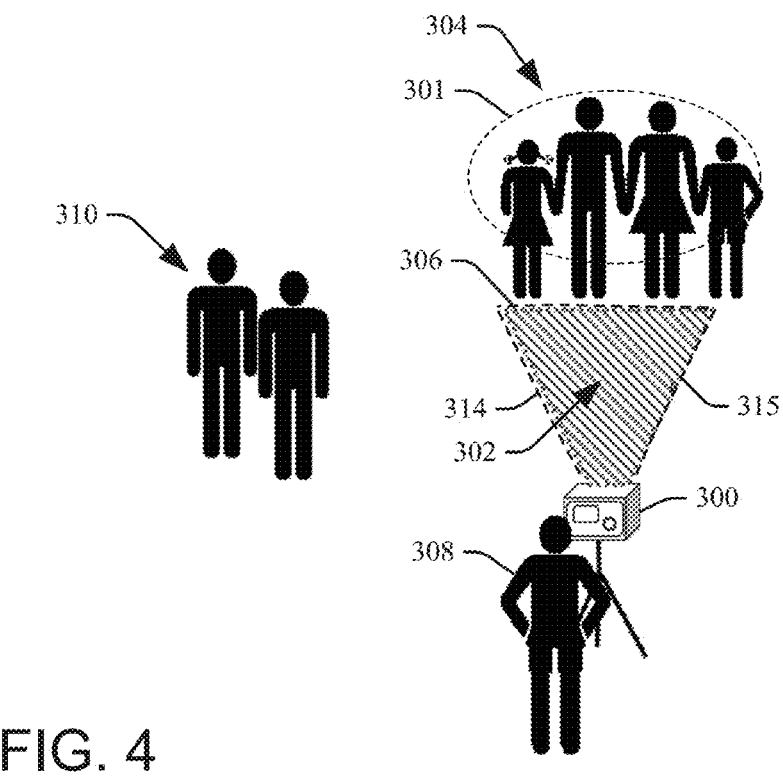
FIG. 4 is a graphic representation of an implementation of another embodiment of the present invention.

FIG. 4 illustrates another, alternative embodiment wherein a (first) supporting surface is differentially illuminated (at 102 of FIG. 2), namely an area or portion 302 of a ground or floor surface that is itself outside (below) of a generally elliptical focal area 301 of a camera 300 that spreads outward with increasing distance from a lens of the camera 300 to a location of a group 304 of subjects of a photograph to be taken by the camera 200 under operation of a photographer 308. In this embodiment, the subjects 304 are visible objects within the focal area of the camera 300, but they are not illuminated (at 102 of FIG. 2), and the floor surface area 302 does not itself appear in nor is it captured within the photograph by the camera 300, as it is below and outside of the focal area 301. However, if either of pedestrians 310 walk upon the first supporting surface area 302, they will be visible objects within the camera focal area, and thus within the image data acquired by the camera 300.

The dimensions of the first supporting surface area 302 are defined as the portion of the floor surface that is located directly beneath left and right outer boundary lines 314 and 315, respectively, of the camera focal area 301 and spanning from the camera lens (as projected downward onto the floor surface) to the locations of the subjects 304, which in one example is a subject location boundary line 306 that may be defined by two or more points of contact of the subjects 304 with the floor surface. The area 302 is thus defined as describing a portion of a floor surface wherein objects located thereon (persons) will be within the focal area 301 of the camera 300.

In one example, illumination of the first supporting surface area 302 is generated (at 102, FIG. 2) by the photographer 308 depressing a shutter button (not shown) half-way or by otherwise triggering an auto-focus function of the camera 300, which causes the first supporting surface area 302 to be clearly illuminated with light as shown in FIG. 3 (in this example, with a plurality of parallel lines of light drawn upon the floor surface, though other patterns and forms may be practiced). This visually, quickly and efficiently conveys a warning to nearby pedestrians 310 to stay out of the area 302 that is illuminated with the lines of light, indicating to them that they should pause rather than walk through this space 302 as a photograph or video image is about to be taken.

As the first supporting surface area 302 is outside of the focal area 301, unless the light reflects upward or otherwise onto the subject 304 and is therefore substantially captured by an image data receiving means of the camera 300, the step 106 may be omitted in some embodiments, wherein the first supporting surface area 302 remains illuminated during the capturing step 108.

Figure 5:
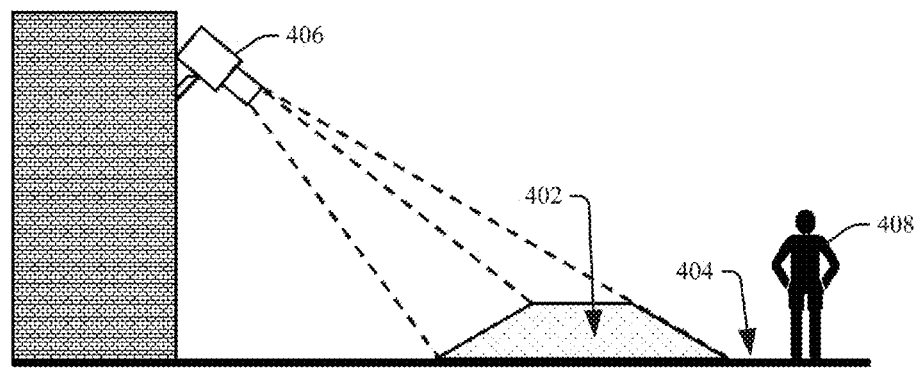
FIG. 5 is a graphic representation of an implementation of another embodiment of the present invention.

FIG. 5 illustrates another alternative embodiment wherein a (first) supporting surface that is differentially illuminated (at 102 of FIG. 2) is a portion or subset 402 of an encompassing totality of a floor space area 404 that is available for occupancy by persons within a public space (for example a train station platform, street, sidewalk, hallway, etc.) The first supporting surface portion 402 is marked with light to convey to persons within the public space the boundaries of the portion of the encompassing floor space area 404 that is remotely monitored by a security camera 406, wherein standing within the portion 402 ensures that a person is within the focal area of the security camera 406 and thus is within a "safe area" 402. Thus, the illumination of the safe floor portion 402 quickly and efficiently conveys notice to the person 408, in real-time, that they are outside the scope of coverage of the security camera 406, enabling the person 408 to simply relocate into the safe floor portion 402 to enhance their personal security and safety. Marking the area 402 with visible light may also serve as a deterrent for inappropriate conduct, positively notifying and indicating to vandals that the area is being monitored and discouraging graffiti or other vandalism behaviors.

Figure 6:
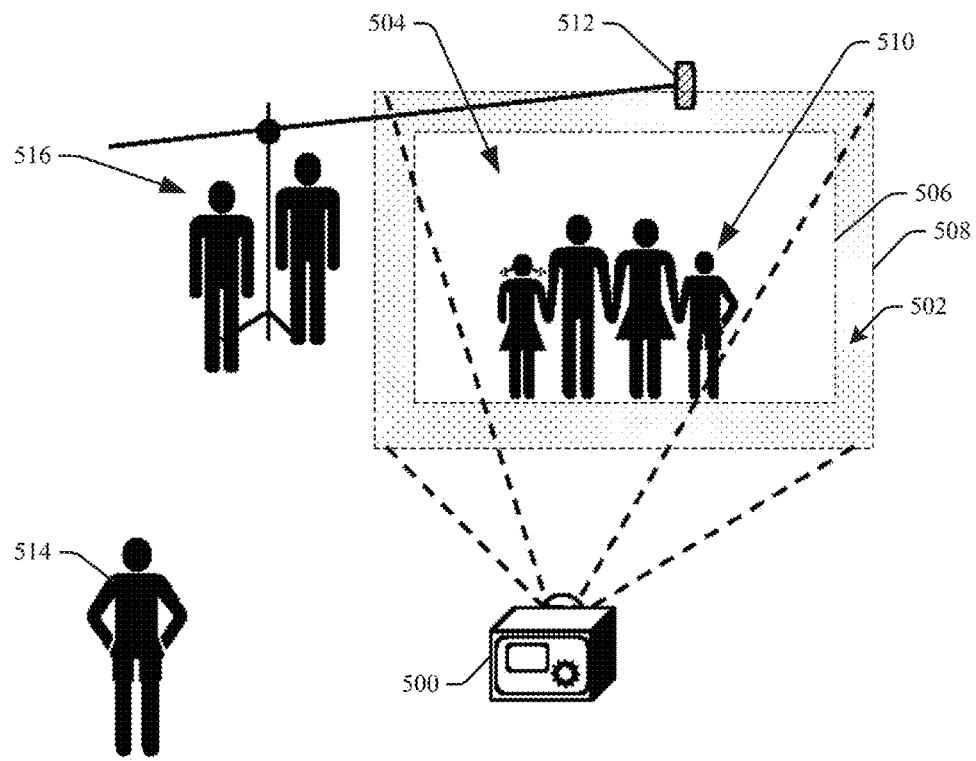
FIG. 6 is a graphic representation of an implementation of another embodiment of the present invention.

FIG. 6 illustrates another alternative embodiment wherein a frame marker 502 is painted with laser light around and outside of the frame (out of shot) of a camera 500 focal area 504 (at 104, FIG. 2). The scope of the frame marker 502 is defined by an inner frame border 506 that is coextensive (generally equivalent to) with outer boundaries of the focal area 504. In this example, the frame 502 has an outer boundary frame border 508, though this is optional and some examples may illuminate a remainder of 360 degrees of coverage about the camera 500, and thus everything outside of the inner frame boundary 506.

In the prior art, the boundaries of acceptable mic 512 locations may be hard to determine. A director or other supervisor 514 of filming and crew members 516 on site may not be able to see what is in-frame of the camera 500 without looking through a viewfinder, interfering with real-time direction of movements on the site. Such problems are exacerbated when the camera 500 or subjects 510 are moving during the image information capture, with delays in determining or translating locations via viewfinder mechanisms to present locations of objects, persons and focal planes resulting in mismatches between a desired scene composition of visible objects 510 and the real-time presence or absence of objects within the camera focal plane 504 at any given time. For example, a boom operator 516 may dip a boom microphone (mic) 512 into the shot, and only realize this when it is seen in a video viewfinder feed, which is too late as the shot has already been ruined by the presence of the mic 512.

In contrast, in the present example, the light used to define the frame 502 illuminates the mic 512 when it is within the scope of the frame 502, giving the boom operator real-time, visual feedback notice as to whether the mic is acceptably close (it is colored red and therefore sufficiently close but not within the frame 502), or not (no longer illuminated in whole or part by the frame 502 light, therefore too close and within the view.)

In some examples, the frame 502 is defined to provide notice as to a preferred location of a boom mic 512 relative to subjects 510 of a film or video shoot. The outer boundary frame border 508 is defined to be a certain distance from the inner frame 506 wherein location of the mic 512 within the frame 502 ensures that the mic 512 is close enough to get quality audio information from the subjects 510 while remaining outside of the focal area 504 (and thus outside of the shot). The present example enables the boom operator of the microphone crew 516 to get the mic 512 as close as possible to the subjects 510, to just before the point where it stops being illuminated by the frame 502 light, ensuring that the equipment does not appear in the frame of the shot, and also ensuring that the mic 512 is not too far away to get good audio (signified by moving the mic outside of the frame 502 wherein it is no longer "painted "with the frame 502 light).

The present embodiment also enables the film director 514 to see and verify that the members of the boom microphone crew 516 and other associated equipment are also well out of the frame 502 and therefore will not be in the shot. Both director 514 and crew 516 are given notice of the shot framing without the need to consult viewfinder information that may not be directly available to either in real-time. This embodiment may also be more suitable than the embodiment of FIG. 3 where avoiding distractions or effects caused by shining light toward the subjects 510 (as in step 102 of FIG. 2) is desirable. The frame 502 illumination (at 104, FIG. 2) may also be continual during image acquisition (step 108, FIG. 2), and thus in some examples the step of revising illumination amount or type (at step 106, FIG. 2) is omitted.

Alternative embodiments of the present invention may mark the boundaries of the camera focal areas, or of the bordering areas immediately outside (such as the frame area 502 of FIG. 6), with a variety of techniques, including with light elements that illuminate only portions of boundaries of the respective focal areas and excluded areas. For example, colored dots projected and displayed at frame corners of rectangular focal areas or excluded area frames, and still other geometric elements and locations may be selectively illuminated.

In some embodiments, the color of the light, intensity of the light and other type or nature of the illuminations provided at 102 or 104 of FIG. 2 can be varied to convey a change in status of operation or monitoring of the camera (for example, the camera or live monitoring thereof is on or off), or a change in status of the first supporting surface relative to an occupancy of an observer (that persons have permission to enter or exit, or are requested to approach or to leave, etc.), or additional or different information. For example, the color, amount or type of light illuminating the safe floor portion 402 of FIG. 5 may be changed to indicate a different state or status, such as a first state that indicates that the camera is merely recording activities for future review and processing of historic data as needed, in contrast to a second, higher security state (indicated by a different light color, or pulsing rate, etc.) that indicates that a security officer is now actively monitoring images acquired by the camera in real-time, and can thus initiate an Emergency Medical Services (EMS) system in response to seeing an occurrence of a medical emergency in real-time, etc.

Security staff may also selectively illuminate the portion 402, or change its color/pulsing, etc., relative to the other remaining floor area 404 (or relative to the illumination amounts and types used for other safe area portions (not shown)) to convey additional information, such as in combination with addressing commuters over the PA system to indicate the portion 402 of the overall floor area 404 that is the subject of the announcement, or to visually indicate to arriving first responders where someone needing medical assistance is located, relative to other possible areas.

In photographic and video and other film contexts (such as in the examples of FIGS. 3, 4 and 6) the temporal status of image acquisition procedures and activities may be also conveyed by different colors, etc. For example, illumination may comprise yellow light during shot set-up, red light for notice that filming is about to begin, and green light during filming, etc.

In some embodiments, the duration of an acquisition time period is defined as a function of a frame rate of the image data receiving means, and a duration of an illumination time period as a remainder of time between frames of the frame rate of the image data receiving means. Frame rate, also known as frame frequency, is a frequency (rate) at which an imaging device displays consecutive images called frames. Frame rates are used in film (analog) and video (digital)

camera domains, as well as in computer graphics and motion capture systems. Frame rate is often expressed in frames per second (FPS).

Humans are capable of processing and individually perceiving separate images within a stream of images if the number or rate of image presentment does not exceed between 10 to 12 per second, and this capacity may be used to define frame rates in film and video stream presentations. Generally, the duration of presentment of each image is at a rate that exceeds 10 to 12 per second, so that the stream of images are perceived as a continuous or contiguous stream of image information, rather than a series of individual images. Frame rates used to define the acquisition time period and illumination time period may thus vary dependent on the image data receiving means. Examples include 16 FPS or 18 FPS for 16 mm and standard 8 mm film format, 18 FPS for Super 8 film formats, and 24 FPS for film formats that incorporate synchronous sound. Television and digital cinema formats conventionally utilize arrays of digital sensors for the image data receiving means, and wherein 24 FPS is typically a minimum frame rate, though faster rates are also common, for example 25, 30, 50, 60 or 300 FPS, etc. However, there are many FPS variations and the present examples are illustrative but not exhaustive.

In some embodiments, pulsed laser lighting is used to differentially illuminate the persons and objects within or without the lens focal area (at 102 and/or 104 of FIG. 2). For example, for a video camera system one or more lasers are pulsed on between frames recorded by the image data receiving means, allowing for the subjects within a focal area to be painted in laser light in between frame data acquisitions. Using the frame-rate pulsing technique may enable persons to see the laser light as a fairly constant light illumination, in spite of the pulsing on and off, due to retina lag or persistence of vision. Turning the light off as each frame is recorded allows for clean video images to be acquired by the image data receiving means from the focal area 220 from visible data imparted by the laser light while it is pulsed off.

Some embodiments differentially illuminate the persons and objects within or without the lens focal area (at 102 and/or 104 of FIG. 2) by projecting light, such as laser light, outward from a camera lens, or from other structures adjacent thereto, which also helps in giving camera operators, subjects and onlookers a visual queue as to how a shot is currently framed, in real time.

In some embodiments, where it is not practical to embed the illumination light sources within the camera equipment, laser or other light sources are located separately relative to the camera. The camera may send information including focal length, lens zoom and aperture information, etc. to a central processing unit controlling such separate light sources, to ensure that the differential illumination is coextensive with the focal area of the camera.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a camera field of view visualizer, the method comprising executing on a processor the steps of:

projecting for an illumination time period a first illumination light onto a portion of a first supporting surface that is located outside of and directly beneath a generally elliptical focal area of a camera lens that spreads outward with increasing distance from the camera lens, wherein the portion is defined as an area of the first supporting surface that is not visible within the focal area relative to the camera lens that is bounded by left and right outer boundary lines projected downward from outer boundaries of the generally elliptical focal area, and wherein a first object located upon the first supporting surface portion projects upward into and is visible within the focal area relative to the camera lens;

at an end of the illumination time period, in response to a determination that the first illumination light is visible within image information that is acquired from the first object illuminated thereby within the focal area, revising an amount or type of the projected first illumination light for an image data acquisition time period, wherein the revised amount or type of the projected first illumination light is not visible within the image information acquired by the image data receiving means from the first object illuminated thereby; and capturing via the image data receiving means, during the acquisition period of time, photographic image information from the first object that is located on the first supporting surface portion and thereby within the focal area, wherein the image data receiving means does not capture photographic image information from the first supporting supporting surface portion during the acquisition period of time.

2. The method of claim 1, further comprising:

integrating computer-readable program code into a computer system comprising the processor, a computer readable memory in circuit communication with the processor, and a computer readable storage medium in circuit communication with the processor; and wherein the processor executes program code instructions stored on the computer-readable storage medium via the computer readable memory and thereby performs the steps of projecting for the illumination time period the first illumination light onto the first supporting surface portion, revising the amount or type of the projected first illumination light for the image data acquisition time period at the end of the illumination time period in response to the determination that the projected first illumination light is visible within image information that is acquired from the first object illuminated thereby within the focal area, and capturing via the image data receiving means during the acquisition period of time the image information from the first object that is located on the first supporting surface portion and within the focal area.

3. The method of claim 1, wherein the step of projecting the first illumination light onto the first supporting surface portion for the illumination time period comprises projecting the first illumination light outward from the camera lens in a direction that is below and coextensive with an angle of view of the camera lens focal area and bounded by a boundary line defined by two points of contact of the first object with the first supporting surface portion.

4. The method of claim 1, wherein the step of capturing the photographic image information during the acquisition time period is selected from a group of steps consisting of:
opening a camera shutter at a beginning of the acquisition time period and closing the open camera shutter at an end of the acquisition time period, wherein the image data receiving means is a photographic film negative; and
receiving image information from at least one digital image sensor during the acquisition time period, wherein the image data receiving means is an array of digital image sensors.

5. The method of claim 4, wherein the step of projecting the first illumination light onto the first supporting surface portion for the illumination time period comprises illuminating objects including the first object and surfaces that are located in front of the camera lens and within the focal area of the camera lens with light projected outward from the camera lens in a direction that is coextensive with an angle of view of the focal area of the camera lens;
wherein the outward projected light is perceivable as visible light by human eye via reflection from the objects and surfaces located in front of the camera lens and within the focal area of the camera lens; and
wherein the step of revising the amount or type of the projected first illumination light for the image data acquisition period of time comprises terminating the light projecting of the first illumination light outward from the camera lens coextensive with the angle of view of the focal area of the camera lens that is visible light perceivable by human eye via reflection, thereby preventing the outward projected first illumination light from being perceivable as visible light by human eye via reflection from the objects and surfaces located in front of the camera lens and within the focal area of the camera lens during the acquisition period of time.

6. The method of claim 5, further comprising:
defining a duration of the acquisition time period as a frame rate of the image data receiving means, and a duration of the illumination time period as a remainder of time between frames of the frame rate of the image data receiving means.

7. The method of claim 6, wherein the first illumination light projected outward from the camera is laser light, the method further comprising:
pulsing the laser light projected outward between frames recorded by the image data receiving means in a pulsing rate that corresponds to the frame rate so that subjects within the focal area are painted in the laser light in between frame data acquisitions, and that corresponds to a human retina lag or persistence rate so that the pulsed laser light is perceived as constant light illumination; and
at an end of the acquisition period of time, iteratively repeating the steps of differentially illuminating the objects and surfaces located in front of the camera lens and within the focal area of the camera lens with the first illumination light for the illumination period of time, terminating the differential illuminating for the image data acquisition period of time at the end of the illumination period of time, and capturing the image information focused upon the image data receiving means by the camera lens during the acquisition period of time, to thereby generate a plurality of different individual frames of images.

8. The method of claim 1, further comprising:
defining the first supporting surface area portion as a portion of a floor surface that is located directly beneath the camera lens focal area and spanning between the outer boundary lines projected downward from the outer boundaries of the generally elliptical focal area from a location of the first object on the floor surface, to a location of the camera lens as projected downward onto the floor surface.

9. The method of claim 8, further comprising:
revising a color, intensity, or pulsing pattern of the illumination of the first supporting surface portion to indicate a change in status of operation or monitoring of the camera, or a change in status of the first supporting surface relative to an occupancy of an observer.

10. The method of claim 1, wherein the step of projecting the first illumination light onto the first supporting surface portion for the illumination time period comprises projecting a pattern of lines upon the first supporting surface portion that visually conveys a warning to pedestrians to stay out of the area of the first supporting surface portion.

11. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
projects for an illumination time period a first illumination light onto a portion of a first supporting surface that is located outside of and directly beneath a generally elliptical focal area of a camera lens that spreads outward with increasing distance from the camera lens, wherein the portion is defined as an area of the first supporting surface that is not visible within the focal area relative to the camera lens that is bounded by left and right outer boundary lines projected downward from outer boundaries of the generally elliptical focal area, and wherein a first object located upon the first supporting surface portion projects upward into and is thereby visible within the focal area relative to the camera lens;
at an end of the illumination time period, in response to a determination that the first illumination light is visible within image information that is acquired from the first object illuminated thereby within the focal area, revises an amount or type of the projected first illumination light for an image data acquisition time period, wherein the revised amount or type of the first illumination light is not visible within the image information acquired by the image data receiving means from the first object illuminated thereby; and captures via the image data receiving means during the acquisition period of time photographic image information from the first object that is located on the first supporting surface portion and thereby within the focal area, wherein the image data receiving means does not capture photographic image information from the first supporting surface portion during the acquisition period of time.

12. The system of claim 11, wherein the processor executes the program instructions stored on the computer-readable storage medium via the computer readable memory and thereby further:

projects the first illumination light outward from the camera lens in a direction that is below and coextensive with an angle of view of the focal area of the camera lens and bounded by a boundary line defined by two points of contact of the first object with the first supporting surface.

13. The system of claim 11, wherein the processor executes the program instructions stored on the computer-readable storage medium via the computer readable memory and thereby further:

captures the photographic image information during the acquisition time period by a step selected from the group consisting of opening a camera shutter at a beginning of the acquisition time period and closing the open camera shutter at an end of the acquisition time period, wherein the image data receiving means is a photographic film negative, and receiving image information from at least one digital image sensor during the acquisition time period, wherein the image data receiving means is an array of digital image sensors;

illuminates objects including the first object and surfaces that are located in front of the camera lens and within the focal area of the camera lens with light projected outward from the camera lens in a direction that is coextensive with an angle of view of the focal area of the camera lens and is perceivable as visible light by human eye via reflection from the objects and surfaces located in front of the camera lens and within the focal area of the camera lens; and revises the amount or type of the projected first illumination light for the image data acquisition period of time by terminating the projection of the first illumination light outward from the camera lens coextensive with the angle of view of the focal area of the camera lens that is visible light perceivable by human eye via reflection, thereby preventing the outward projected first illumination light from being perceivable as visible light by human eye via reflection from the objects and surfaces located in front of the camera lens and within the focal area of the camera lens during the acquisition period of time.

14. The system of claim 13, wherein the first illumination light projected outward from the camera is laser light, and wherein the processor executes the program instructions stored on the computer-readable storage medium via the computer readable memory and thereby further:

defines a duration of the acquisition time period as a frame rate of the image data receiving means, and a duration of the illumination time period as a remainder of time between frames of the frame rate of the image data receiving means;

pulses the laser light projected outward between frames recorded by the image data receiving means in a pulsing rate that corresponds to the frame rate so that subjects within the focal area are painted in the laser light in between frame data acquisitions, and that corresponds to a human retina lag or persistence rate so that the pulsed laser light is perceived as constant light illumination; and at an end of the acquisition period of time, iteratively repeats steps of differentially illuminating the objects and surfaces located in front of the camera lens and within the focal area of the camera lens with the first illumination light for the illumination period of time, terminating the differential illuminating for the image data acquisition period of time at the end of the illumination period of time, and capturing the image information focused upon the image data receiving means by the camera lens during the acquisition period of time, to thereby generate a plurality of different individual frames of images.

15. The system of claim 11, wherein the processor executes the program instructions stored on the computer-readable storage medium via the computer readable memory and thereby:

projects the first illumination light onto the first supporting surface portion for the illumination time period in a pattern of lines that visually conveys upon the first supporting surface portion a warning to pedestrians to stay out of the area of the first supporting surface portion.

16. A computer program product for a camera field of view visualizer, the computer program product comprising:

a computer readable storage medium having computer readable program code embodied therewith, wherein the computer readable storage medium is not a transitory signal per se, the computer readable program code comprising instructions for execution by a processor that cause the processor to:

project for an illumination time period a first illumination light onto a portion of a first supporting surface that is located outside of and directly beneath a generally elliptical focal area of a camera lens that spreads outward with increasing distance from the camera lens, wherein the portion is defined as an area of the first supporting surface that is not visible within the focal area relative to the camera lens that is bounded by left and right outer boundary lines projected downward from outer boundaries of the generally elliptical focal area, and wherein a first object located upon the first supporting surface portion projects upward into and is thereby visible within the focal area relative to the camera lens:

at an end of the illumination time period, in response to a determination that the first illumination light is visible within image information that is acquired from the first object illuminated thereby within the focal area, revise an amount or type of the projected first illumination light for an image data acquisition time period, wherein the revised first illumination light is not visible within the image information acquired by the image data receiving means from the first object illuminated thereby; and capture via the image data receiving means during the acquisition period of time photographic image information from the first object that is located on the first supporting surface and thereby within the focal area, wherein the image data receiving means does not capture photographic image information from the first supporting surface portion during the acquisition period of time.

17. The computer program product of claim 16, wherein the computer readable program code instructions for execution by the processor further cause the processor to:

project the first illumination outward from the camera lens in a direction that is below and coextensive with an angle of view of the focal area of the camera lens and bounded by a boundary line defined by two points of contact of the first object with the first supporting surface.

18. The computer program product of claim 16, wherein the computer readable program code instructions for execution by the processor further cause the processor to:

capture the photographic image information during the acquisition time period by a step selected from the group consisting of opening a camera shutter at a beginning of the acquisition time period and closing the open camera shutter at an end of the acquisition time period, wherein the image data receiving means is a photographic film negative, and receiving image information from at least one digital image sensor during the acquisition time period, wherein the image data receiving means is an array of digital image sensors;

illuminate objects including the first object and surfaces that are located in front of the camera lens and within the focal area of the camera lens with light projected outward from the camera lens in a direction that is coextensive with an angle of view of the focal area of the camera lens and is perceivable as visible light by human eye via reflection from the objects and surfaces located in front of the camera lens and within the focal area of the camera lens; and revise the amount or type of the first illumination light for the image data acquisition period of time by terminating the projection of the first illumination light outward from the camera lens coextensive with the angle of view of the focal area of the camera lens that is visible light perceivable by human eye via reflection, thereby preventing the outward projected first illumination light from being perceivable as visible light by human eye via reflection from the objects and surfaces located in front of the camera lens and within the focal area of the camera lens during the acquisition period of time.

19. The computer program product of claim 18, wherein the first illumination light projected outward from the camera is laser light, and wherein the computer readable program code instructions for execution by the processor further cause the processor to:

define a duration of the acquisition time period as a frame rate of the image data receiving means, and a duration of the illumination time period as a remainder of time between frames of the frame rate of the image data receiving means;

pulse the laser light projected outward between frames recorded by the image data receiving means in a pulsing rate that corresponds to the frame rate so that subjects within the focal area are painted in the laser light in between frame data acquisitions, and that corresponds to a human retina lag or persistence rate so that the pulsed laser light is perceived as constant light illumination; and at an end of the acquisition period of time, iteratively repeat steps of differentially illuminating the objects and surfaces located in front of the camera lens and within the focal area of the camera lens with the first illumination light for the illumination period of time, terminating the differential illuminating for the image data acquisition period of time at the end of the illumination period of time, and capturing the image information focused upon the image data receiving means by the camera lens during the acquisition period of time, to thereby generate a plurality of different individual frames of images.

20. The computer program product of claim 16, wherein the computer readable program code instructions for execution by the processor further cause the processor to:

project the first illumination light onto the first supporting surface portion for the illumination time period in a pattern of lines that visually conveys a warning to pedestrians to stay out of the area of the first supporting surface portion.

* * * * *